(12) United States Patent
Dagalakis et al.

(10) Patent No.: US 8,437,006 B2
(45) Date of Patent: May 7, 2013

(54) DISPLACEMENT SENSOR WITH EMBEDDED COHERENT ELECTROMAGNETIC RADIATION INTERFEROMETER FOR MICRO SCALE PROXIMITY MEASUREMENTS

(76) Inventors: Nicholas G. Dagalakis, Gaithersburg, MD (US); Yong-Sik Kim, Gaithersburg, MD (US)

(*) Notice: Subject to any disclaimer, the term of this patent is extended or adjusted under 35 U.S.C. 154(b) by 132 days.

(21) Appl. No.: 12/958,577

(22) Filed: Dec. 2, 2010

(65) Prior Publication Data

US 2012/0162661 A1    Jun. 28, 2012

(51) Int. Cl.
*G01B 9/02*    (2006.01)

(52) U.S. Cl.
USPC ............................................. 356/482

(58) Field of Classification Search .......... 356/477, 356/482, 498; 250/277.19, 227.27
See application file for complete search history.

(56) References Cited

U.S. PATENT DOCUMENTS

| | | | | |
|---|---|---|---|---|
| 4,785,171 | A * | 11/1988 | Dowling et al. | 250/227.28 |
| 5,381,229 | A * | 1/1995 | Murphy et al. | 356/477 |
| 5,990,474 | A * | 11/1999 | Atia et al. | 250/234 |
| 6,467,761 | B1 | 10/2002 | Amatucci et al. | |
| 6,741,355 | B2 * | 5/2004 | Drabarek | 356/482 |
| 7,339,679 | B2 * | 3/2008 | Drabarek et al. | 356/479 |
| 8,077,323 | B2 * | 12/2011 | Drabarek et al. | 356/480 |

OTHER PUBLICATIONS

Gorman, Jason J. et al. "Control of Mems Nanopositioners with Nano-scale Resolution". Proceedings of IMECE 2006, 2006 ASME International Mechanical Engineering Congress and Exposition, Nov. 5-10, 2006, pp. 1-9.*
Osami Sasaki and Takamasa Suzuki, Interferometric Displacement Sensors Using Sinosoidal Phase-Modulation and Optical Fibers, Proceedings of SPIE vol. 5633 (2005).
Displacement Measurement Method by Sinosoidal Phase-Modulating Laser Interferometry, Niigata University, http://www.niigata-tlo.com/lng_eng/patent/clg_niigata/012_meas_eng.pdf, (2010).
Dagalakis et al., Kinematic Modeling of a 6 Degree of Freedom Tri-Stage Micro-Positioner, http://www.isd.mel.nist.gov/meso_micro/kinematic_modeling.pdf. (Nov. 2001), American Society for Precision Engineering.
Dagalakis et al., Kinematic Modeling and Analysis of a Planar Micro-Positioner, http://www.isd.mel.nist.gov/meso_micro/MicPosModStdy.pdf. (Nov. 2001), American Society for Precision Engineering.
Gorman et al, Control of MEMS Nanopositioners with Nano-Scale Resolution, http://www.isd.mel.nist.gov/meso_micro/GormanIMECE2006_16190.pdf, (2006), ASME International Mechanical Engineering Congress and Exposition.
Avramov-Zamurovic et al., Embedded Capacitive Displacement Sensor for Nanopositioning Applications, http://www.isd.mel.nist.gov/meso_micro/Short_FC_cpem_1043_Div_Final.pdf, (2010).

* cited by examiner

*Primary Examiner* — Michael A Lyons

(57) ABSTRACT

The present invention is an interferometer sensor which uses frequency modulated coherent electromagnetic radiation to noncontact measure the displacement of moving targets with high precision. The sensor has an embedded interferometer comprised of an electromagnetic radiation source, a plurality of electromagnetic waveguides, interferometric and extension waveguides, a refractive index gel, or angled end face and an electromagnetic radiation detector.

9 Claims, 4 Drawing Sheets

DISPLACEMENT SENSOR WITH EMBEDDED COHERENT ELECTROMAGNETIC RADIATION INTERFEROMETER FOR MICRO SCALE PROXIMITY MEASUREMENTS

STATEMENT OF FEDERALLY SPONSORED RESEARCH

The invention described herein was made by employees of the United States Government and may be manufactured and used by or for the Government of the United States of America for governmental purposes without the payment of any royalties thereon or therefor.

FIELD OF INVENTION

The present invention relates to the field of interferometry and more particularly to a displacement sensor with an embedded coherent electromagnetic radiation interferometer.

BRIEF DESCRIPTION OF THE DRAWINGS

FIG. 1b illustrates a close-up view of area 1b of FIG. 1a.

GLOSSARY

Figure 1A:
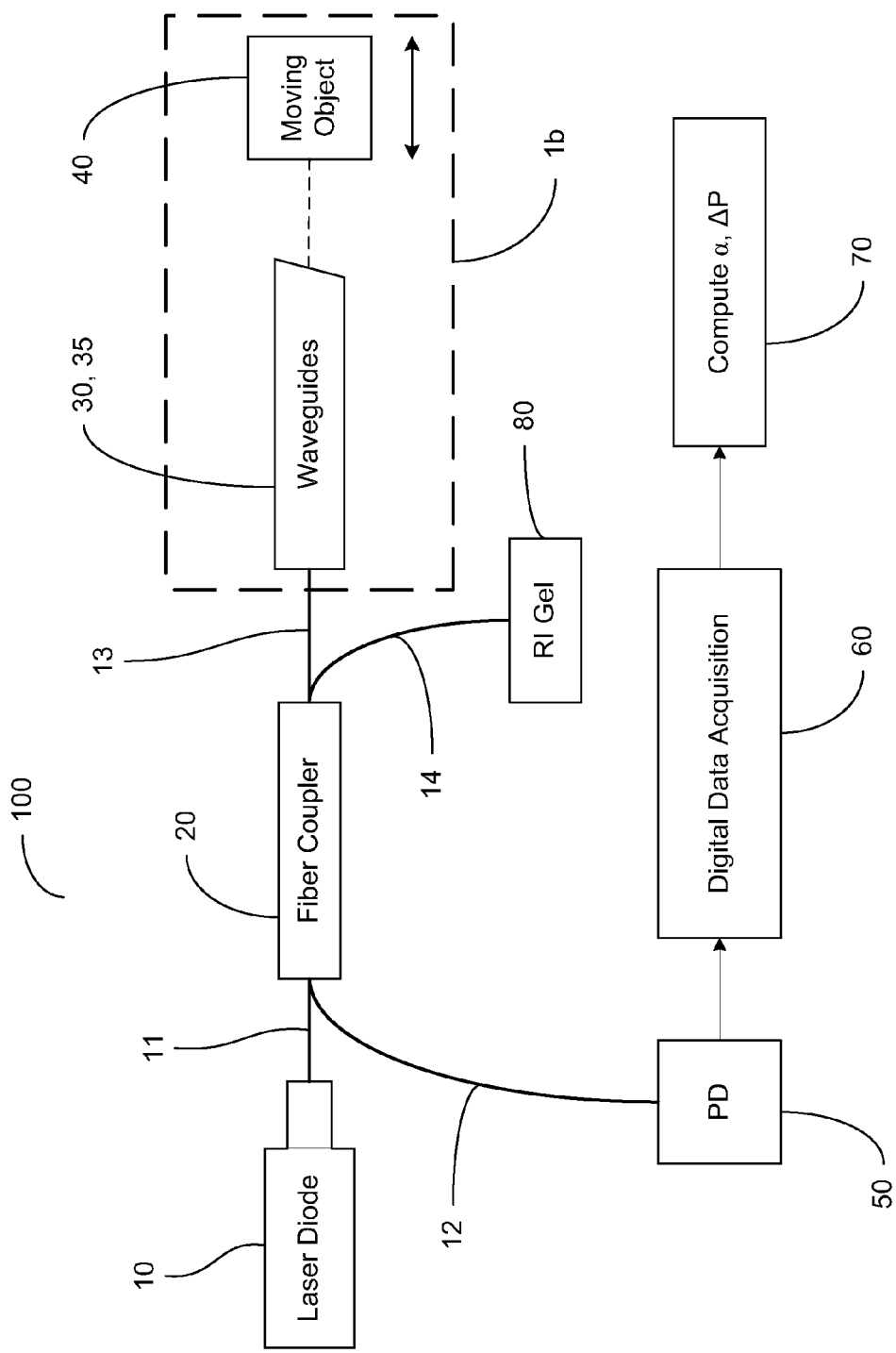
FIG. 1a illustrates a schematic of an exemplary embodiment of a displacement sensor with embedded coherent electromagnetic radiation interferometer for micro scale proximity measurements.

As used herein, the term "non-stationary target" refers to an object that does not have a fixed position.

As used herein, the term "refractive index gel" refers to a material that has a refractive index and dispersion to coherent electromagnetic radiation that closely matches the refractive index and dispersion of the interferometer waveguide for the same electromagnetic radiation.

BACKGROUND

The tremendous growth of opto-electronic device manufacturing has raised the need for high performance micro and nanopositioners, which are used in assembly and alignment. The static and dynamic performance of micro and nanopositioners depends in part on the quality of operation of their controllers, which in turn depends to a significant degree on the accuracy of the kinematic and dynamic mathematical models upon which they are based.

The utilization of microelectromechanical systems (MEMS) for nanotechnology research and nanomanufacturing has a number of critical applications. The combination of MEMS and nanotechnology, however, presents a number of new challenges not experienced in more common MEMS applications in sensors and telecommunications. Most importantly, precision motion control of MEMS actuators is critical as resolution, accuracy, and repeatability are expected to be on the order of nanometers.

Nanopositioners equipped with nanoprobes are devices that can precisely manipulate nano-scale objects. The sizes of the nanopositioners used for this work are a few hundreds of micrometers. Motion range is 25 µm to 50 µm and desired step resolution is a few nm. The nm resolution opens the possibility to control nano-objects, such as nano wires and biological or chemical building blocks. These requirements constrain motion control law specifications in terms of the system precision and dynamic performance. A displacement sensor is a critical component in controlling the motion of a nanopositioner.

Displacement sensors, which are known in the art, can be embedded into the devices along the axes of the actuators, eliminating Abbe sine displacement measurement error and improving the accuracy capability of the nanopositioner. Designing a displacement sensor that can be embedded in an MEMS device is extremely difficult due to the small size of the devices, which typically have an external dimension of 1 mm to 3 mm and are made of a single crystal of silicon.

One example of a displacement sensor is disclosed by Osami Sasaki and Takamasa Suzuki in *Interferometric Displacement Sensors Using Sinusoidal Phase-Modulation and Optical Fibers* (Advanced Materials and Devices for Sensing and Imaging II, Proceeding of SPIE, Vol. 5633 (2005)) (hereinafter Sasaki et al.). The displacement sensor disclosed by Sasaki et al. generates coherent electromagnetic radiation using a laser diode coupled to an optical fiber through an optical isolator and lens. The injection current to the diode is modulated with a sinusoidal signal of controlled amplitude. The electromagnetic radiation is distributed to two optical fibers using a coupler. A portion of the electromagnetic radiation traveling through the first optical fiber is reflected by the end face of that fiber and forms the interferometer reference signal, which travels back through the optical fiber and falls on a photodetector. Another portion of the electromagnetic radiation traveling through the first optical fiber is reflected by the object (target) surface and propagates back through the optical fiber and falls on the photodetector. The photodetector detects the interference signal of the two waveforms.

The electromagnetic radiation traveling through the second optical fiber is directed to a photodiode that detects the intensity of the laser diode signal.

In addition, the Sasaki et al. technique requires that a feedback controller be used in order to maintain the amplitude of the laser diode current $\alpha=(\lambda_0^2/4\beta P)$, where P is the distance between the end face of the first optical fiber and the object (target) reflecting surface, $\lambda_0$ is the mean value of the modulated electromagnetic radiation wavelength, $\beta$ is the modulation efficiency of the electromagnetic radiation source. If that condition is satisfied, the distance P is given by $P=\alpha(\lambda_0/4\pi)$, where $\alpha$ is an angle determined by data obtained from the interferometric signal.

The amplitude of the laser diode current makes the Sasaki et al. technique impractical for use in MEMS devices. Due to the size of the MEMS devices, the interferometric sensor distance P ranges from a few micrometers to 150 µm. For a typical value of $\beta=0.0171$ nm/mA, the required current amplitude for a $\lambda_0=1550$ nm is $\alpha=234.16$ mA, which is a high power requirement that is impractical.

It is desirable to have a displacement sensor that requires a low voltage and power supply.

It is desirable to have a displacement sensor which is on a micro/nano scale size and is capable of being embedded in a microchip device to integrate the electromagnetic radiation source and the controller electronics in the device.

It is desirable to have a displacement sensor that can be interfaced with macro scale components.

It is desirable to have a displacement sensor that has range of up to a few millimeters, target proximity from a few micrometers to 0 micrometers, and accuracy, repeatability and resolution of a few nanometers.

It is desirable to have a displacement sensor that is non contact and has no moving components.

It is desirable to have a displacement sensor that is inexpensive to manufacture.

SUMMARY OF THE INVENTION

The present invention is an interferometer sensor which uses frequency modulated coherent electromagnetic radiation to noncontact measure the displacement of non-stationary targets with high precision. The sensor has an embedded interferometer comprised of an electromagnetic radiation source, a plurality of waveguides, interferometric and extension waveguides, a refractive index gel, and an electromagnetic radiation detector. The distance of the waveguide embedded interferometer from the extension waveguide end face, measured along the waveguide centerline, should not exceed $\lambda_0^2/4\beta\alpha$, where $\lambda_0$ is the mean value of the modulated electromagnetic radiation wavelength, $\beta$ is the modulation efficiency of the electromagnetic radiation source, and $\alpha$ is the amplitude of the modulation signal.

In an exemplary embodiment, the end face of the extension waveguide is angled, which minimizes the electromagnetic radiation back reflection along the centerline of the waveguide. The distance between the waveguide end face and the target surface can range from a few micrometers to 0 micrometers. During operation, the value of a should be controlled so that $\epsilon=(\lambda_0^2/4\beta\alpha)-L_w$, where $\epsilon$ is the distance between the end tip of the waveguide and the target and $L_w$ is the distance of the waveguide embedded interferometer from the waveguide end face, both measured along the waveguide centerline. The target surface should be sufficiently reflective in order to generate a detectable interferometric signal.

DETAILED DESCRIPTION OF INVENTION

For the purpose of promoting an understanding of the present invention, references are made in the text to exemplary embodiments of a displacement sensor with embedded coherent electromagnetic radiation interferometer for micro scale proximity measurements, only some of which are described herein. It should be understood that no limitations on the scope of the invention are intended by describing these exemplary embodiments. One of ordinary skill in the art will readily appreciate that alternate but functionally equivalent components, materials, and placement may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1a illustrates an exemplary embodiment of displacement sensor 100 with embedded coherent electromagnetic radiation interferometer for micro scale proximity measurements. Displacement sensor 100 is comprised of laser diode 10, fiber coupler 20, interferometric waveguide 30, extension waveguide 35, photodetector 50, refractive index gel 80, signal processor 60 for digital data acquisition, and computer 70 for calculating $\alpha$ and $\Delta P$. Laser diode 10 generates electromagnetic radiation that travels through first optical fiber 11 into fiber coupler 20. Fiber coupler 20 distributes electromagnetic radiation through optical fibers 13, 14. The portion of the electromagnetic radiation traveling through optical fiber 14 passes through optical object 80 and into refractive index gel contained in object 80. The gel absorbs the electromagnetic radiation and prevents any back reflection through fiber 14. Any functionally equivalent means that absorbs the electromagnetic radiation and prevents any back reflection is acceptable. For example, the gel or an angled waveguide end face could also serve the same purpose.

A second portion of the electromagnetic radiation traveling through optical fiber 13 passes through interferometric waveguide 30 with embedded extension waveguide 35. Interface 32 between interferometric waveguide 30 and embedded extension waveguide 35 forms a back reflecting discontinuity that generates electromagnetic radiation reference beam 15 (see FIG. 1b).

Figure 1B:
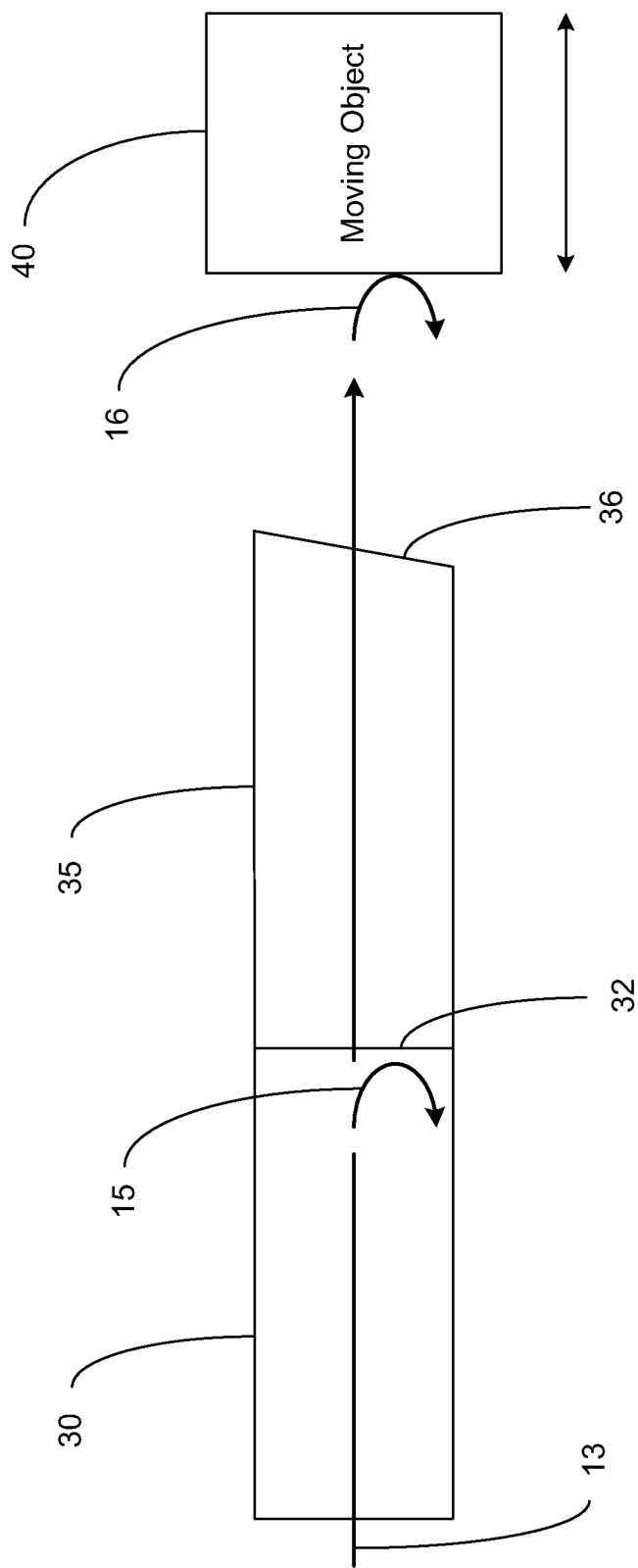

After passing interferometric waveguide 30 and extension waveguide 35, the electromagnetic radiation beam reflects off moving object 40 generating moving target electromagnetic radiation beam 16 (see FIG. 1b). Moving target electromagnetic radiation beam 16 propagates back through extension waveguide 35, interferometric waveguide 30, and fiber coupler 20. Moving target electromagnetic radiation beam 16 then passes through optical fiber 12 and falls on photodetector 50.

Photodetector 50 detects the interference signal of electromagnetic radiation reference beam 15 and target electromagnetic radiation beam 16.

In the embodiment shown, extension waveguide 35 has an angled end face 36 which prevents a second electromagnetic radiation beam from being generated. The waveguide end face angle has an optimum value, which ranges from 5° to 15° for a $\lambda_0=1550$ nm. Antireflecting coating of the waveguide end face can also have a beneficial effect in preventing a radiation back reflection. The distance between the waveguide end face and the target surface can be a minimum of zero to a few micrometers. During operation, the value of a should be controlled so that $\epsilon=(\lambda_0^2/4\beta\alpha)-L_w$, where $\epsilon$ is the distance between the end tip of the waveguide and the target and $L_w$ is the distance of the waveguide embedded interferometer from the waveguide end face, both measured along the waveguide centerline. The target surface should be sufficiently reflective in order to generate a detectable interferometric signal.

In an exemplary embodiment, an extension waveguide 35 was added to the interferometric waveguide 30 with a length $L_w$ which does not exceed $(\lambda_0^2/4\beta\alpha)$, where $\lambda_0$ is the mean value of the modulated electromagnetic radiation wavelength, $\beta$ is the modulation efficiency of the electromagnetic radiation source, and a is the amplitude of the modulation signal. With the addition of the extension waveguide 35, P now equals $L_w+\epsilon$, where $L_w$ is the length of the extension waveguide 35 and $\epsilon$ is the distance between the extension waveguide 35 end face and moving object 40. Since now $P=L_w+\epsilon$ it is easy to meet the Sasaki condition with a relatively low power coherent electromagnetic radiation source. In an exemplary embodiment, the current amplitude can be maintained by a laser diode with an embedded optical isolator and lens. Any source of coherent electromagnetic radiation known in the art, which allows frequency modulation, may also be used.

FIG. 1b illustrates a close-up view of interferometric waveguide 30, interface 32, extension waveguide 35 having angled face 36, and moving target 40. Also visible are optical fiber 13, electromagnetic radiation reference beam 15, and moving target electromagnetic radiation beam 16.

In an exemplary embodiment, the coherent electromagnetic radiation source (e.g., laser diode 10) is located on the device microchip; however, in other embodiments, the electromagnetic radiation source is not located on the microchip, but rather may be interfaced with the microchip using a flexible waveguide (e.g., an optical fiber) or a funnel waveguide interface. For example, the front face of extension waveguide 35 could be shaped as a funnel that will collect and focus the radiation produced by the electromagnetic radiation source. In addition, this macro-to-micro scale interface could serve as the waveguide interferometer discontinuity.

Figure 2:
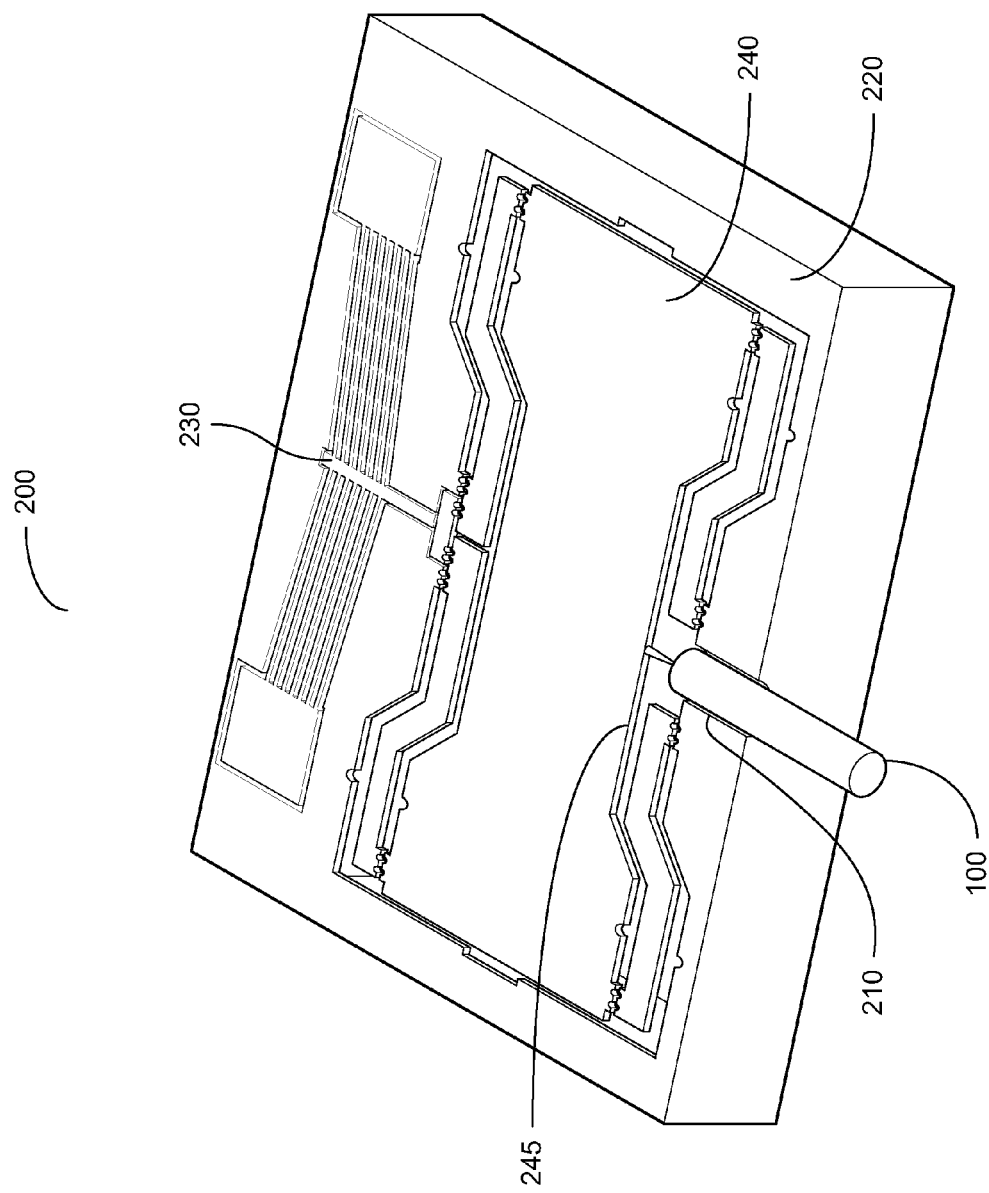
FIG. 2 illustrates a perspective view of an exemplary embodiment of a planar nanopositioner fitted with single mode optical fiber waveguide.

FIG. 2 illustrates a perspective view of an exemplary embodiment of planar nanopositioner 200 fitted with single mode optical fiber waveguide 100 (e.g., end portion of 35 in FIG. 1b). In the embodiment shown, trench 210 has been etched on nanopositioner supporting frame 220. The opening of trench 210 has a size equal to the diameter of optical fiber 100 of the displacement sensor. The centerline of trench 210 is aligned with the centerline of nanopositioner actuator 230.

In the embodiment shown, when displacement sensor is in position, the end face of optical fiber 100 is pointing to back face 245 of nanopositioner moving stage 240 at an approximately 100 µm distance.

Figure 3:
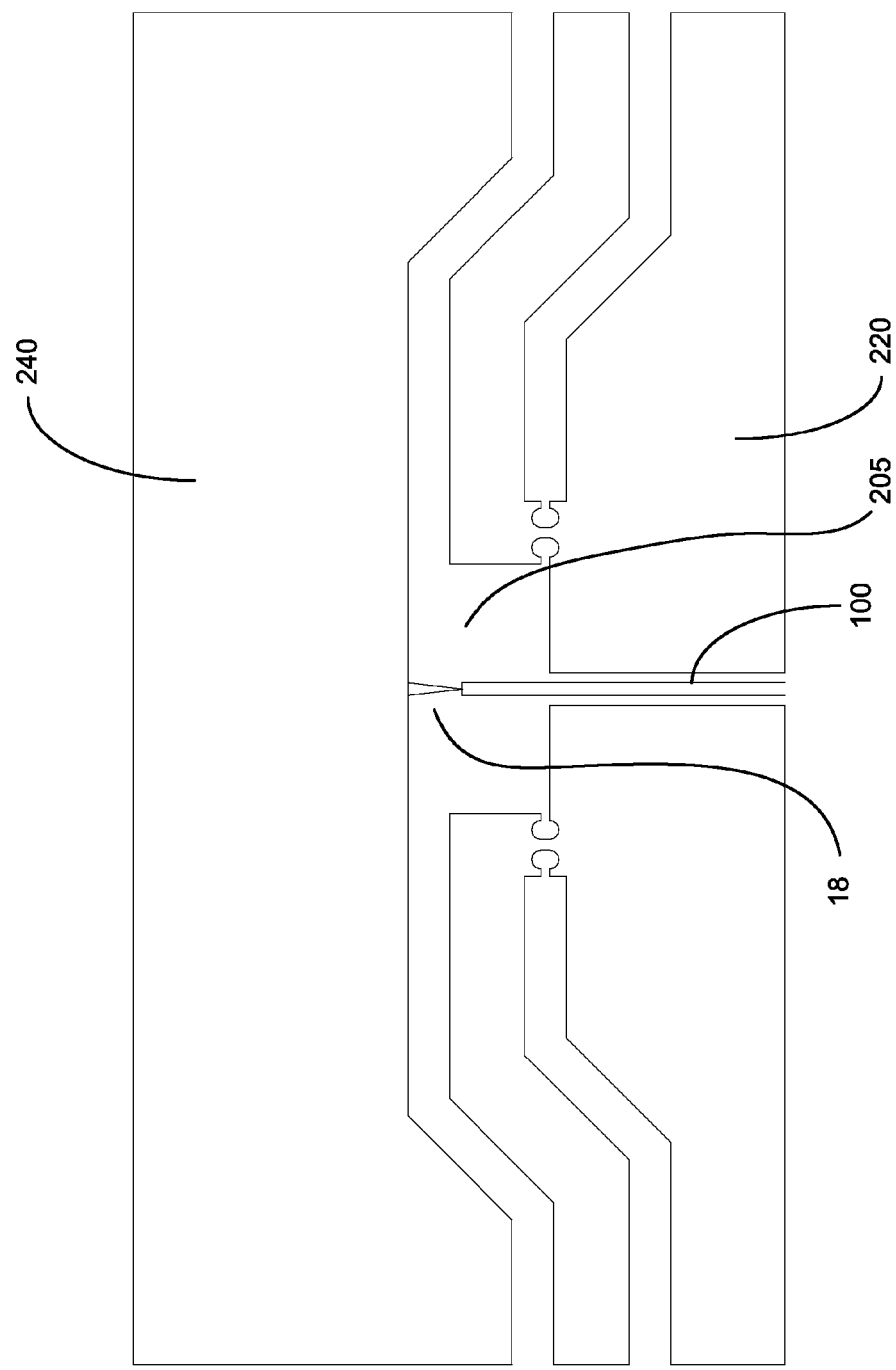
FIG. 3 illustrates a close-up view of the end face of an optical fiber when visible electromagnetic laser radiation is injected through the optical fiber.

FIG. 3 illustrates a close-up view of the end face of optical fiber 100 when visible electromagnetic laser radiation is injected through waveguides 13, 30 (not shown) and optical fiber 35. In the embodiment shown, electromagnetic radiation beam 18 is illuminating back face 245 of moving stage 240.

In the embodiment shown, nanopositioner 200 is fabricated from a single crystal of silicon. Slot 205, which separates moving stage 240 from supporting frame 220 is cut using a Deep Reactive Ion Etching process, resulting in a smooth surface that reflects electromagnetic radiation in the range of 600 nm to 1600 nm.

In the embodiment shown, electromagnetic radiation beam 18 ranges from 1 mW to 2 mW. A low power beam in this range results in a strong interferometric signal.

In various embodiments, the distance between end face 36 and the moving target may be varied. In an exemplary embodiment, end face 36 of waveguide 35 is placed as close as possible to the moving target (e.g., back face 245 of moving stage 240), as long as it is not interfering with the motion of the moving target. Since most coherent electromagnetic radiation beams have a certain amount of divergence, placing end face 36 in close proximity to the moving target allows for the maximum amount of electromagnetic radiation reflected from the target surface to reach end face 36.

In various other embodiments, displacement sensor 100 may be designed so that extension waveguide 35 protrudes from displacement sensor 100 in order to bring it closer to the moving target. A protruding waveguide design may be designed in order not to interfere with the motion of the stage and its supporting lever mechanisms, at its maximum range of motion.

A performance test was designed to determine the accuracy of displacement sensor 100 in reproducing the motion profile of nanopositioner moving stage 240. Standard step height artifacts were positioned and first checked with a white light interferometer for height accuracy and then were translated underneath end face 36 of extension waveguide 35 of displacement sensor 100. Several tests were performed and two straight lines were fitted to the sensor output data, one for each scanned surface. The distance between the two lines was measured and compared with the measured step height. The average accuracy error and standard deviation were then calculated. In one embodiment, for a step having a height of 91.3 nm, the average error and standard deviation were calculated to be 5.587 nm and 2.023 nm, respectively. Displacement may be measured as photons are reflected back and enter through face 36 and generate a strong interferometric signal. The maximum distance depends on the power of the coherent electromagnetic wave, the beam divergence angle and the reflectivity of the moving target surface. Adding a focusing lens and/or increasing the beam power may extend the measurable range.

Using the performance test, it was determined that end face 36 of extension waveguide 35 has an optimum angle, with respect to the waveguide centerline, of approximately 8° and approximately 6° with antireflection coating for a $\lambda_0=1550$ nm. Another important finding was that the intensity of the signal passing through optical fiber 14 (non interferometric signal) does not change much and can be ignored, eliminating an intensity compensation division from the feedback control algorithm and saving control loop cycling time. This signal is replaced by a sinusoid fitted on the interferometric signal data in order to determine the values of key algorithmic data. Further simplification of the controller algorithm is also possible with the realization that the value of the control loop feedback does not change significantly during normal operating conditions. This allows the setting of the value of a (laser diode 10 modulation current amplitude) at the beginning of an operation and then continuing with open loop controller operation, resulting in an increase in the controller cycling frequency by a factor of 10, which is critical for high speed nanopositioner motions. Cycling frequency is the inverse of the time it takes to measure the photodetector 50 signal, solve the displacement problem to determine P and then calculate $\alpha$ using the formula ($\alpha=\lambda_0^2/4\beta P$). Generally this time is a few mille seconds. The value of $\alpha$ may be calculated from $\alpha=(\lambda_0^2/4\beta P)$, or after running the feedback control loop for a short time and then switching to open loop operation. In the embodiment shown, the signal generated by photodetector 50 is used in order to maintain the proper modulation current amplitude of the laser diode 10.

What is claimed is:

1. A displacement sensor apparatus for measuring the displacement of a non-stationary target comprised of:
   a coherent electromagnetic radiation source having a power in the range of 1 mW to 2 mW and capable of frequency modulation, said electromagnetic radiation source produces an electromagnetic radiation beam;
   a waveguide coupler operatively coupled to said coherent electromagnetic radiation source with a first optical fiber;
   an electro-magnetic radiation absorption component comprised of refractive index gel coupled to said waveguide coupler with a second optical fiber;
   an interferometric waveguide coupled to said waveguide coupler with a third optical fiber;
   an extension waveguide having an end face angled within a range of 5° to 15°;
   an interface between said interferometric waveguide and said extension waveguide creating a back reflecting discontinuity;
   wherein said electromagnetic radiation beam passes through said waveguide coupler which distributes a first portion of said electromagnetic radiation beam to said electro-magnetic radiation absorption component and a second portion of said electromagnetic radiation beam through said interferometric waveguide and said extension waveguide;

wherein said interface generates an electromagnetic radiation reference beam from said portion of said electromagnetic radiation beam distributed through said interferometric waveguide and said extension waveguide;

a target electromagnetic radiation beam reflected from said non-stationary target and received by said extension waveguide, wherein said non-stationary target is at a distance from said end face within a range of 0 to a few micrometers;

an electromagnetic radiation detector configured to detect interference between said electromagnetic radiation reference beam and said target electromagnetic radiation beam, wherein said electromagnetic radiation detector is coupled to said waveguide coupler with a fourth optical fiber and operatively coupled to a signal processor.

2. The apparatus of claim 1 wherein said electromagnetic radiation source is a laser diode.

3. The apparatus of claim 1 wherein said electromagnetic radiation source is located on a device microchip.

4. The apparatus of claim 1 wherein said electromagnetic radiation source is interfaced with a microchip using a flexible waveguide.

5. The apparatus of claim 1 wherein said electromagnetic radiation source is interfaced with a microchip using a funnel waveguide interface.

6. The apparatus of claim 1 wherein said non-stationary target is a non-stationary stage of a nanopositioner.

7. The apparatus of claim 6 wherein said displacement sensor is positioned so said second waveguide lines up with the centerline of an actuator of said nanopositioner.

8. A microelectromechanical system having precision motion control comprised of:
  an embedded displacement sensor for measuring the displacement of a non-stationary target comprised of:
    a coherent electromagnetic radiation source having a power in the range of 1 mW to 2 mW and capable of frequency modulation, said electromagnetic radiation source produces an electromagnetic radiation beam;
    a waveguide coupler operatively coupled to said coherent electromagnetic radiation source with a first optical fiber;
    an electromagnetic radiation absorption component operatively coupled to said waveguide coupler with a second optical fiber, wherein said electromagnetic radiation absorption component is selected from the group consisting of a refractive index gel and an angled end face;
    an interferometric waveguide coupled to said waveguide coupler with a third optical fiber;
    an extension waveguide having a diameter and are end face angled within a range of 5° to 15°;
    an interface between said interferometric waveguide and said extension waveguide creating a back reflecting discontinuity;
    wherein said electromagnetic radiation beam passes through said waveguide coupler which distributes a first portion of said electromagnetic radiation beam to said electromagnetic radiation absorption component and a second portion of said electromagnetic radiation beam through said interferometric waveguide and said extension waveguide;
    wherein said interface generates an electromagnetic radiation reference beam from said portion of said electromagnetic radiation beam distributed through said interferometric waveguide and said extension waveguide;
    a target electromagnetic radiation beam; and
    an electromagnetic radiation detector configured to detect interference between said electromagnetic radiation reference beam and said target electromagnetic radiation beam, wherein said electromagnetic radiation detector is coupled to said waveguide coupler with a fourth optical fiber and operatively coupled to a signal processor; and
  a nanopositioner comprised of:
    a supporting frame having a trench, wherein the diameter of said trench corresponds to said diameter of said extension waveguide,
    a non-stationary stage at a distance from said end face within a range of 0 to a few micrometers wherein said non-stationary stage reflects said portion of electromagnetic radiation beam passing through said interferometric waveguide and said extension waveguide to generate said target electromagnetic radiation beam;
    a slot which separates said supporting frame from said non-stationary stage; and
    an actuator aligned with said trench;
  wherein said embedded displacement sensor is placed in said trench and positioned so that said end face of said extension waveguide is pointing at said non-stationary stage.

9. The system of claim 8 wherein said nanopositioner is fabricated from silicon crystal or other materials.

* * * * *